June 4, 1957     A. G. SCHILBERG     2,794,650

SIDE RAIL CONSTRUCTION FOR A VEHICLE FRAME

Filed Feb. 28, 1955

INVENTOR.
ARNOLD G. SCHILBERG
BY Andrus + Scealer
ATTORNEYS

United States Patent Office 2,794,650
Patented June 4, 1957

2,794,650

SIDE RAIL CONSTRUCTION FOR A VEHICLE FRAME

Arnold G. Schilberg, Milwaukee, Wis., assignor to A. O. Smith Corporation, Milwaukee, Wis., a corporation of New York Application February 28, 1955, Serial No. 490,965

2 Claims. (Cl. 280—106)

This invention relates to vehicle frame construction and more particularly to a side rail for a vehicle frame having abrupt vertical offsets for receiving the wheel axles as employed in vehicles having a low-floor body.

Conventionally, a vehicle side rail is comprised of a single channel member or box-section member having generally curved offset or kicked-up portions which conform to the wheel supporting structure of the vehicle. However, for low-floor body vehicles, such as milk and bottler's trucks and the like, gradual or curved offsets are undesirable because they materially decrease the loading space and constitute interferences which prevent economical loading of the vehicle. While abrupt offsets are more desirable for loading purposes, the abrupt offsets generally leave the single element side rail frame member too weak in the offset area to resist twist attributable to lateral bending of the frame member.

According to the present invention a vehicle frame side rail having abrupt vertical offsets is fabricated from a plurality of elements to provide an offset area having strength and rigidity characteristics capable of withstanding the forces imposed thereon in service.

The invention is directed to a built-up side rail for a vehicle frame of dropped-floor construction. The side rail is composed of a series of longitudinally extending, channel-shaped sections with a pair of the sections being upwardly offset from the remaining sections to provide clearances within which the front and rear wheel axles of the vehicle are to be located.

The end portions of the offset sections are spaced above and overlap the corresponding end portions of the lower sections and are connected thereto by a plate which is secured to the outer surface of each of the sections.

To provide added rigidity at the joint between the offset section and the lower section, a channel member is welded endwise between the overlapping end portions of the sections. The channel member, in combination with the plate and the end portions of the side rail sections, provides a box-shaped structure capable of resisting twisting stresses imposed on the joint by lateral bending of the side rail.

The drawing furnished herewith illustrates the best mode of carrying out the invention as presently contemplated and set forth hereinafter.

Figure 1:
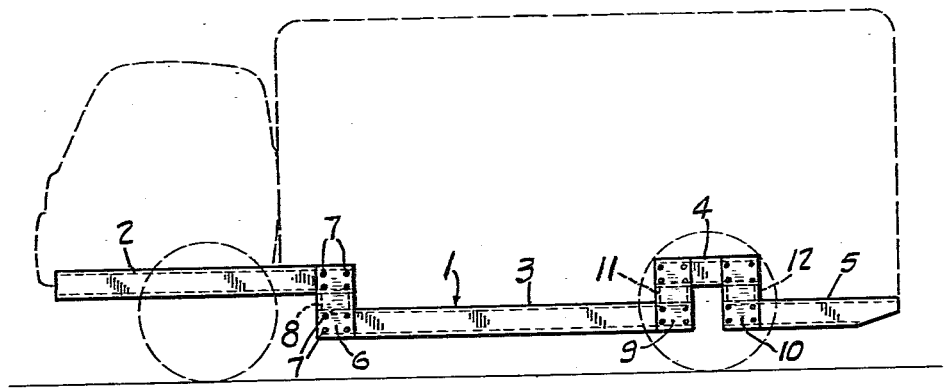
Figure 1 is a side elevation of a side rail frame member fabricated according to the invention and showing a low-floor body in dashed lines superimposed thereon.
Figure 2:
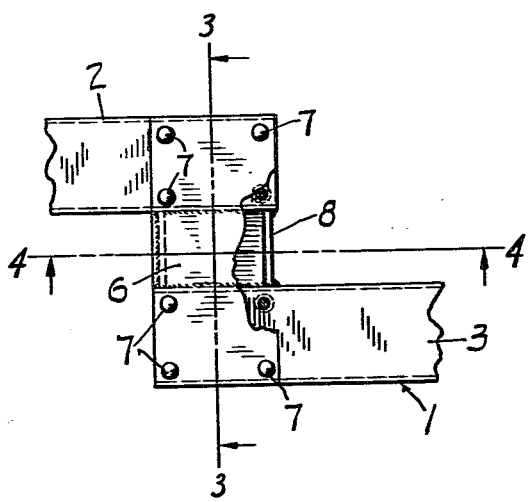
Fig. 2 is an enlarged partial view of the side rail shown in Figure 1 with parts broken away to show details of the box structure between the horizontally disposed channel members.
Figure 3:
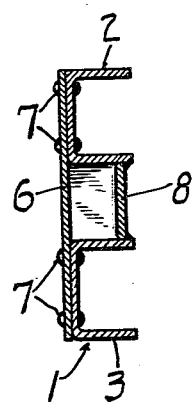
Fig. 3 is a view taken on line 3—3 of Fig. 2.
Figure 4:
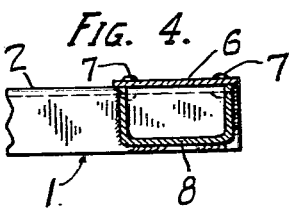
Fig. 4 is a view taken on line 4—4 of Fig. 2.

The drawings illustrate a side rail 1 for a vehicle frame adapted to be used with a low or dropped-floor vehicle, such as a milk or bottler's truck, which requires a maximum volume of storage space and head room within the truck.

The side rail 1 consists generally of a forward upwardly offset section 2, a central lower section 3, a rear offset section 4 and a rear lower section 5 which extend longitudinally of the frame. Offset sections 2 and 4 are disposed in a plane above the wheel axles of the vehicle to permit the axles to pass therebeneath, while the lower sections 3 and 5 are located in a plane beneath that of sections 2 and 4 and serve to support a lowered or dropped floor for the vehicle in order to obtain an increased storage space therein. The end portions of the offset sections 2 and 4 overlap the adjacent end portions of the lower sections 3 and 5.

Each of the side rail sections has a generally channel-shaped cross section with the open side of the section facing inwardly of the frame.

The overlapping end portions of the side rail sections 2 and 3 are connected together by a plate 6 which is secured flatwise against the outer surface of the web of the sections by a plurality of rivets 7.

Added support is provided for the joint between sections 2 and 3 by a channel member 8 which is disposed endwise between the lower flange of the section 2 and the upper flange of the section 3. The open side of the channel member 8 faces outwardly of the frame and the flanges of the channel member 8 are welded edgewise to the inner surface of plate 6. In addition, the ends of the channel member 8 are welded to the corresponding flanges of the sections 2 and 3.

The channel member 8 together with the plate 6 and the opposed flanges of the sections 2 and 3, form a generally box-shaped structure which provides increased strength and rigidity at the offset joint.

The end portions of side rail section 4 are attached to the corresponding, spaced, underlying end portions of the lower sections 3 and 5 in a manner similar to that described above. Plates 9 and 10, corresponding to plate 6, connect the web portion of section 4 to the corresponding web portions of sections 3 and 5, respectively, and channel members 11 and 12, corresponding in structure and function to channel member 8, are secured endwise between the overlapping end portions of the section 4 and the sections 3 and 5, respectively, to provide the desired box-shaped structure at the offset joints.

The side rail member fabricated according to the invention provides abrupt vertical offsets for receiving the vehicle wheel axles. The strength and rigidity characteristics of the offset area are capable of withstanding the forces imposed on the offset area in service.

The abrupt offset construction of the side rail of the invention provides a structure particularly adaptable to low-floor body vehicles providing maximum loading space and minimum interference with economical loading.

Various modes of carrying out the invention are contemplated as within the scope of the following claims particularly pointing out and distinctly claiming the subject matter which is regarded as the invention.

I claim:

1. In a side rail for vehicle frames, a pair of vertically spaced longitudinally offset structural members having overlapping end portions disposed in substantially parallel planes, a connecting member spanning the vertical distance between the structural members at the overlapping end portions thereof and being secured to the respective structural members to join the members together, and a vertically extending channel member corresponding in length to the vertical distance between the overlapping end portions of said structural members and secured endwise between said end portions with the flanges of said channel member being secured to the connecting member, said channel member together with the overlapping end portions of the structural members and the connecting member forming an enclosed strong and rigid box-section between the spaced structural members capable of resisting twist imposed on the box-section by bending of the structural members.

2. In a side rail for a vehicle frame, a pair of vertically spaced longitudinally offset channel members having overlapping end portions disposed in substantially parallel planes, each of said channel members having a substantially vertical web portion and generally horizontal flanges extending inwardly of the frame, a connecting member having a surface disposed flatwise against the web portions of the overlapping end portions of said channel members, means for securing said connecting member to the respective channel members to join the members together, and a third channel member secured endwise between the opposed flanges of the respective first channel members and having the flanges of the third channel member secured to the flat surface of the connecting member, said third channel member together with the opposed flanges of the respective first channel members and the flat surface of the connecting member providing an enclosed strong and rigid box-section structure between the spaced channel members capable of resisting a twisting action imposed on the box-section by lateral bending of the side rail in service.

References Cited in the file of this patent
UNITED STATES PATENTS

| | | |
|---|---|---|
| 713,748 | Carnahan | Nov. 18, 1902 |
| 1,564,739 | Winn | Dec. 8, 1925 |
| 1,704,843 | Smith | Mar. 12, 1929 |